United States Patent
Maier

(10) Patent No.: US 12,524,645 B2
(45) Date of Patent: Jan. 13, 2026

(54) AUTONOMOUS SELF-LEARNING SYSTEM

(71) Applicant: Friedrich-Alexander-Universität Erlangen-Nürnberg, Erlangen (DE)

(72) Inventor: Andreas Maier, Erlangen (DE)

(73) Assignee: Friedrich-Alexander-Universität Erlangen-Nürnberg, Erlangen (DE)

( * ) Notice: Subject to any disclaimer, the term of this patent is extended or adjusted under 35 U.S.C. 154(b) by 1171 days.

(21) Appl. No.: 17/462,651

(22) Filed: Aug. 31, 2021

(65) Prior Publication Data
US 2021/0390377 A1    Dec. 16, 2021

Related U.S. Application Data

(63) Continuation of application No. PCT/EP2020/055457, filed on Mar. 2, 2020.

(30) Foreign Application Priority Data

Mar. 1, 2019    (DE) .................... 10 2019 105 280.7

(51) Int. Cl.
*G06N 3/006*    (2023.01)
*G06F 18/22*    (2023.01)
(Continued)

(52) U.S. Cl.
CPC ............. *G06N 3/006* (2013.01); *G06F 18/22* (2023.01); *G06N 3/045* (2023.01); *G06N 3/088* (2013.01)

(58) Field of Classification Search
CPC ........ G06N 3/006; G06N 3/044; G06N 3/045; G06N 3/088; G06N 3/092
See application file for complete search history.

(56) References Cited

U.S. PATENT DOCUMENTS

| | | | |
|---|---|---|---|
| 2016/0232440 A1* | 8/2016 | Gregor | G06N 3/044 |
| 2019/0258938 A1* | 8/2019 | Mnih | G06N 3/084 |
| 2019/0259051 A1* | 8/2019 | Silver | G06N 3/006 |

FOREIGN PATENT DOCUMENTS

| | | |
|---|---|---|
| WO | 2018083669 A1 | 5/2018 |
| WO | 2018083671 A1 | 5/2018 |

OTHER PUBLICATIONS

Huang, Xiao, et al. "Brain-inspired motion learning in recurrent neural network with emotion modulation." IEEE Transactions on Cognitive and Developmental Systems 10.4 (Dec. 2018): 1153-1164. (Year: 2018).*
(Continued)

*Primary Examiner* — April Y Blair
(74) *Attorney, Agent, or Firm* — Myers Wolin, LLC

(57) ABSTRACT

A method is provided for controlling a technical system using a first neural network of an agent. A first input vector and a current state ($h_t$) of the first network are converted together into a new state ($h_{t+1}$) of the first network, from which state a first output vector of the first network is generated. The first output vector of the first network is fed to a second neural network. A first output vector of the second network representing an expected reaction of the second network to the first output vector of the first network, is generated from the new state ($w_{t+1}$) of the second network. The first output vector of the second network is compared to the first input vector of the first network, in order to train the first network.

6 Claims, 9 Drawing Sheets

(51) Int. Cl.
   *G06N 3/045*         (2023.01)
   *G06N 3/088*         (2023.01)

(56) References Cited

OTHER PUBLICATIONS

International Search Report issued for corresponding International Patent Application No. PCT/EP2020/055457 dated Jun. 16, 2020.
Huang Xiao et al., "Brain-Inspired Motion Learning in Recurrent Nenral Network With Emotion Modulation," IEEE Transactions on Cognitive and Developmental Systems, IEEE, vol. 10, No. 4, Dec. 1, 2018, pp. 1153-1164, [retrieved on Dec. 6, 2018].
Lee-Johnson et al., "Mobile Robot Navigation Modulated by Artificial Emotions," IEEE Transactions on Systems, Man and Cybernetics—Part B: Cybernetics, IEEE Service Center, Piscataway, NJ, US, vol. 39, No. 2, Apr. 1, 2010, pp. 469-480.
Lin et al., "Adaptive critic anti-slip control of wheeled autonomous robot," Jan. 15, 2007, vol. 1, No. 1, Jan. 15, 2007, pp. 51-57.

* cited by examiner

AUTONOMOUS SELF-LEARNING SYSTEM

CROSS REFERENCE TO RELATED APPLICATIONS

This application is a continuation under 35 U.S.C. § 120 of International Application PCT/EP2020/055457, filed Mar. 2, 2020, which claims priority to German Application No. 10 2019 105 280.7, filed Mar. 1, 2019, the contents of each of which are incorporated by reference herein.

FIELD OF THE INVENTION

The invention pertains to the field of automatic, autonomously operating systems. In particular, the invention relates to a method for controlling a technical system with an agent that implements an artificial neural network.

BACKGROUND

So-called deep neural networks are known from the prior art.

The technologies from the field of artificial neural networks that are essential for the present invention are the so-called recurrent neural networks (feedback neural networks) and so-called reinforcement learning (reinforcing or supporting learning). Both are suitable for modeling an agent with which a technical system can be controlled.

Recurrent neural networks are a technology that make it possible to represent general automata as learnable systems. Examples of this are shown in FIG. 1 and FIG. 2 as simplified block diagrams.

FIG. 1 shows a recurrent neural network known from the prior art. It has an input x, a state $h_t$, and an output y. The input x and the current state $h_t$ are converted together into a new state $h_{t+1}$, i.e., the new state $h_{t+1}$ of the neural network is generated from the input x and the current state $h_t$. The output y is then generated from this new state $h_{t+1}$.

The transitions, which are represented in FIG. 1 and FIG. 2 by dashed arrows, can be learned. Each arrow is a universal function approximator. In the simplest case, the function approximators can be formed by a fully connected network with a hidden layer. Deeper so-called feed-forward models can be used as well. To this purpose, it is necessary to train the network.

It is imperative for the training that pairs comprising an input vector x and a reference vector y* are known. So-called monitored training can thus be carried out, in which various optimization or training methods, such as the so-called gradient descent method or the so-called simulated annealing, can be used. Other optimization or training methods can also be used.

An alternative known from the prior art for a recurrent neural network, namely a so-called long short-term memory network (LSTM), is shown in FIG. 2. These long short-term memory networks also have an internal memory ct. The provision of such an internal memory Ct also makes it possible to model long time dependencies.

More complex memory accesses can also be implemented by using artificial neural networks. The so-called memory-augmented neural networks or neural Turing machines, are one example of this.

Reinforcement learning makes it possible to train self-acting systems that try to achieve a maximum future reward. These systems try to solve a given problem in the best possible way.

The disadvantage of the artificial neural networks known from the prior art is that, regardless of the training method used, an essential prerequisite for training the neural network is that the problem must be precisely formulated and the target variable, i.e., the reward, must be precisely specified. This way, for example, games such as Chess or Go, in which the problem can be precisely formulated and the target variable can be precisely specified, can be solved.

An essential problem of the methods known from the prior art is that either a reference y* is necessary for the training or that the entire world, including all the rules of the game and axioms, has to be modeled for the training.

General problem solvers that are based on artificial neural networks, which learn the rules, i.e., the problem definition and the solution themselves and can thus solve new, unknown problems, are not known in the prior art.

An object of the present invention is therefore to provide solutions with which a technical system can be controlled without having to model the environment of the technical system.

SUMMARY

According to the invention, this object is achieved by a method for controlling a technical system with a first agent according to the independent claim. Advantageous embodiments and further developments of the invention are specified in the dependent claims.

Accordingly, what is disclosed is a method for controlling a technical system with a first agent, wherein the first agent implements a first artificial neural network, wherein a first input vector of the first neural network and a current state of the first neural network are converted together into in a new state of the first neural network, wherein a first output vector of the first neural network is generated from the new state of the first neural network, and wherein the first output vector of the first neural network is fed to a second artificial neural network as the first input vector of the second neural network, wherein the second neural network is implemented by a second agent, the first input vector of the second neural network and a current state of the second neural network are converted together into a new state of the second neural network, a first output vector of the second neural network is generated from the new state of the second neural network, wherein the first output vector of the second neural network represents an expected reaction of the second neural network to the first input vector of the second neural network, and the first output vector of the second neural network is compared to the first input vector of the first neural network in order to train the first neural network.

This means that the overall system can learn its environment in a completely autonomous manner.

The technical system that can be controlled with the first agent can, for example, be a robot or an autonomously driving vehicle.

The second agent can implement a third artificial neural network, wherein the first output vector of the second neural network is fed to the third neural network as the first input vector of the third neural network, a second output vector of the second neural network is fed to the third neural network as a second input vector of the third neural network, wherein the second output vector of the second neural network represents an expected emotion of the new state of the second neural network, the first input vector, the second input vector and the current state of the third neural network are converted together into a new state of the third neural network, a second output vector of the third neural network is generated from the new state of the third neural network, wherein the second output vector of the third neural network represents an expected emotion of the new state of the third neural network, and a first output vector of the third neural network is generated from the new state of the third neural network, which is fed to the second neural network as a further input vector of the second neural network.

It is advantageous if the second output vector of the third neural network is compared to a third reference for the purpose of training the third neural network, wherein the comparison of the second output vector of the third neural network to the third reference comprises the calculation of a distance function, preferably a Euclidean distance, and wherein the third reference represents an ideal state of the second output vector of the third neural network and thus an ideal state of the expected emotion of the new state of the third neural network.

It can also be advantageous if the first neural network and the third neural network are coupled to one another, in particular if the new state of the first neural network and the current state of the third neural network are coupled to one another in order to train the third neural network based on the first neural network or to train the first neural network based on the third neural network.

It has been found to be advantageous if a second input vector is fed to the first neural network, the second input vector, the first input vector and the current state of the first neural network are converted together into the new state of the first neural network, wherein the second input vector of the first neural network represents an emotion, and a second output vector of the first neural network is generated from the new state of the first neural network in addition to the first output vector of the first neural network, wherein the second output vector of the first neural network represents an expected emotion of the new state of the first neural network.

This means that emotions such as pain (comparable to a collision), hunger (comparable to the charge level of a battery), or joy (comparable to achieving a goal, e.g., solving a certain problem) can be taken into account for the training of the overall system or the first neural network.

The second output vector of the first neural network can be compared to a second reference for the purpose of training the first neural network, wherein the comparison of the second output vector of the first neural network to the second reference comprises a calculation of a distance function, preferably a Euclidean distance, and wherein the second reference represents an ideal state of the second output vector of the first neural network and thus an ideal state of the expected emotion of the new state of the first neural network.

It is advantageous if the second output vector of the first neural network is compared to the second input vector of the first neural network, and/or the second output vector of the first neural network is generated from the new state of the first neural network and from the first output vector of the first neural network.

It has furthermore been found advantageous if the second output vector of the second neural network is generated from the new state of the second neural network, and the second output vector of the second neural network is compared to the second input vector of the first neural network in order to train the first neural network.

BRIEF DESCRIPTION OF THE DRAWING

Details and features of the invention as well as specific, particularly advantageous exemplary embodiments of the invention result from the following description in conjunction to the drawing. In the drawings.

DETAILED DESCRIPTION OF THE PREFERRED EMBODIMENTS

The neural networks described below are all artificial neural networks.

With the invention, autonomously self-learning agents can be provided with which a technical system can be controlled. The agents and thus also the respective controlled technical systems can not only work autonomously, but they can also adapt to new environments in an adaptive and autonomous manner. Applications are, for example, robotics, autonomous driving, space travel or medical applications. A robot can be used, for example, in different environments, with the robot being able to learn the new environment autonomously after a change in the environment and thus adapt its behavior to the new environment.

In order to achieve the above-mentioned object, methods in accordance with the invention proposes two extensions to the prior art.

The first extension relates to the introduction of an intrinsic reference of the neural network (hereinafter referred to as the first neural network NN1), i.e., a self-image of the first neural network NN1. The intrinsic reference is referred to below as an emotion.

The second extension relates to the learning of a world model as part of the overall system by using a further neural network (hereinafter referred to as the second neural network NN2). The world model is also referred to below as the worldview.

Both extensions can be combined with each other.

Figure 1:
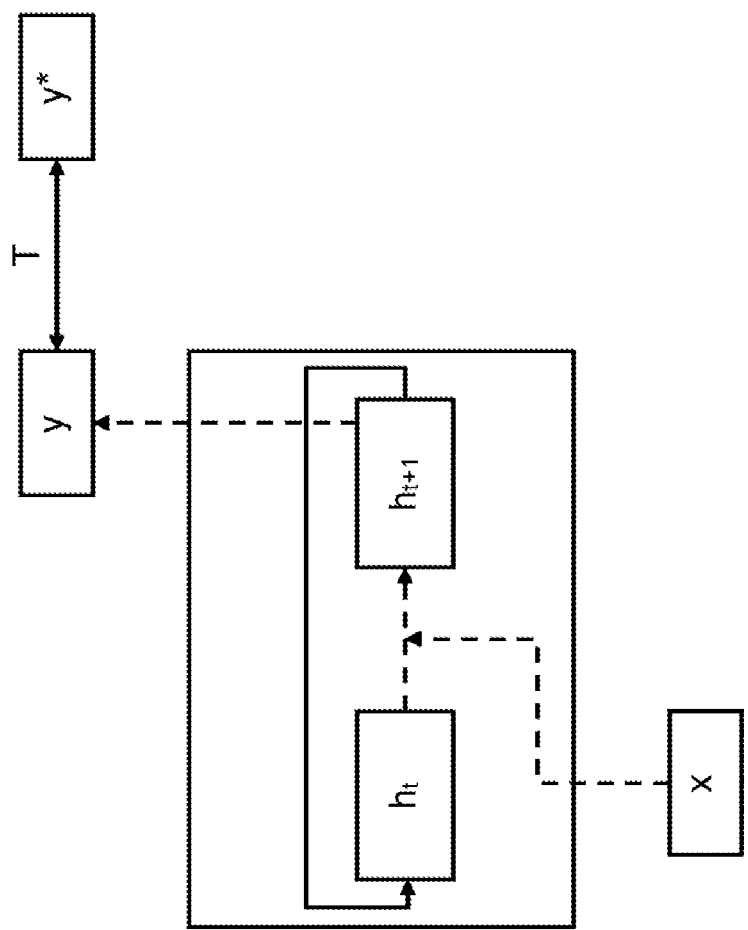
FIG. 1 is an artificial neural network known from the prior art as a recurrent neural network.
Figure 3:
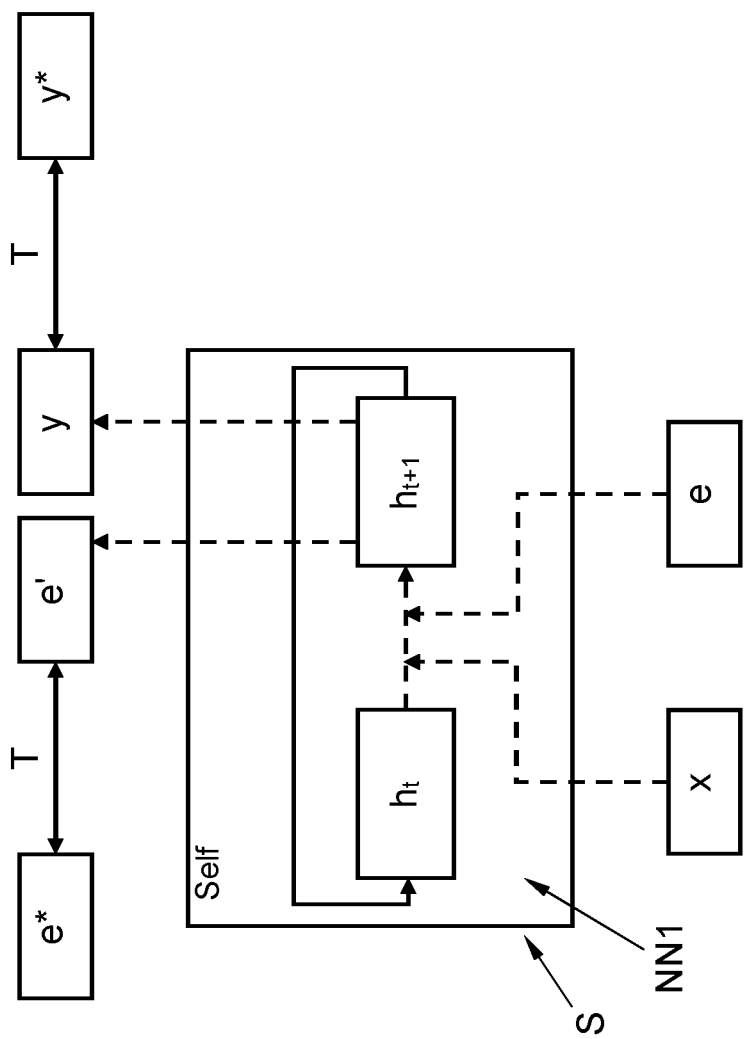
FIG. 3 is a system according to the invention as an extension of the artificial neural network shown in FIG. 1.

FIG. 3 shows an expansion according to embodiments of the invention of the recurrent neural network NN1 shown in FIG. 1 by means of an emotion. The neural network NN1 (first neural network) is implemented by a first agent S. The agent S is also referred to below as Self.

In the prior art, a first input vector x of the first neural network NN1 and a current state $h_t$ of the first neural network NN1 are combined together into a new state $h_{t+1}$ of the first neural network NN1. A first output vector y of the first neural network NN1 is then generated from the new state $h_{t+1}$ of the first neural network NN1. The first output vector y can then be compared to a first reference y* or a first reference vector for the purpose of training the first neural network NN1, for example by using distance function, preferably a Euclidean distance function.

In addition to the first input vector x known from the prior art, a second input vector e is fed to the first neural network NN1. The second input vector e of the first neural network NN1 represents an emotion of the Self or of the first neural network NN1 or of the first agent S.

Since both x and e are vectorial, any number of scalar inputs or emotions can be modeled with both input vectors x, e. The current emotion of the system can therefore contain a plurality of variables, such as pain (for example, when a robot causes a collision), hunger (for example, when a battery is low) or joy (for example, a reward when the technical system to be controlled has performed a task).

Furthermore, in addition to the first output vector y known from the prior art, a second output vector e' is generated. The second output vector e' represents the expected emotion of the next state $h_{t+1}$ of the Self or of the first neural network NN1 or of the first agent S.

The second output vector e' is generated according to embodiments of the invention in that the second input vector e, the first input vector x and the current state $h_t$ of the first neural network NN1 are converted together into the new state $h_{t+1}$ of the first neural network NN1. In contrast to the neural networks known from the prior art, the first output vector y is generated from the new state $h_{t+1}$ generated in this manner, i.e., taking into account the second input vector e. The second output vector e' of the first neural network NN1 is also generated from the new state $h_{t+1}$ generated in this manner.

The expected emotion or the second output vector e' can then be compared to a second reference e* or to a second reference vector for the purpose of training the first neural network NN1, for example by using a distance function, preferably a Euclidean distance function. The second reference e* represents an ideal state of the second output vector e' of the first neural network NN1 and thus an ideal state of the expected emotion of the new state $h_{t+1}$ of the first neural network NN1.

Any suitable distance functions can be used for the comparison of e' to e* or of y to y*.

The ideal state of the expected emotion can be, for example, 0 (i.e., not present) or 1 (i.e., present), with values between 0 and 1 being possible as well.

On the basis of the expansion according to embodiments of the invention shown in FIG. 3, the system is able to train all learnable parameters that lead to the second output vector e' by means of the dashed arrows. For the training itself, methods can also be used that not only optimize the current emotion but also take into account the anticipated emotion in the future, which is comparable to the so-called reinforcement learning.

The dashed arrow leading to the output vector y cannot, however, be trained with emotions alone so that the first reference y* or the first reference vector must be used for this training.

Figure 2:
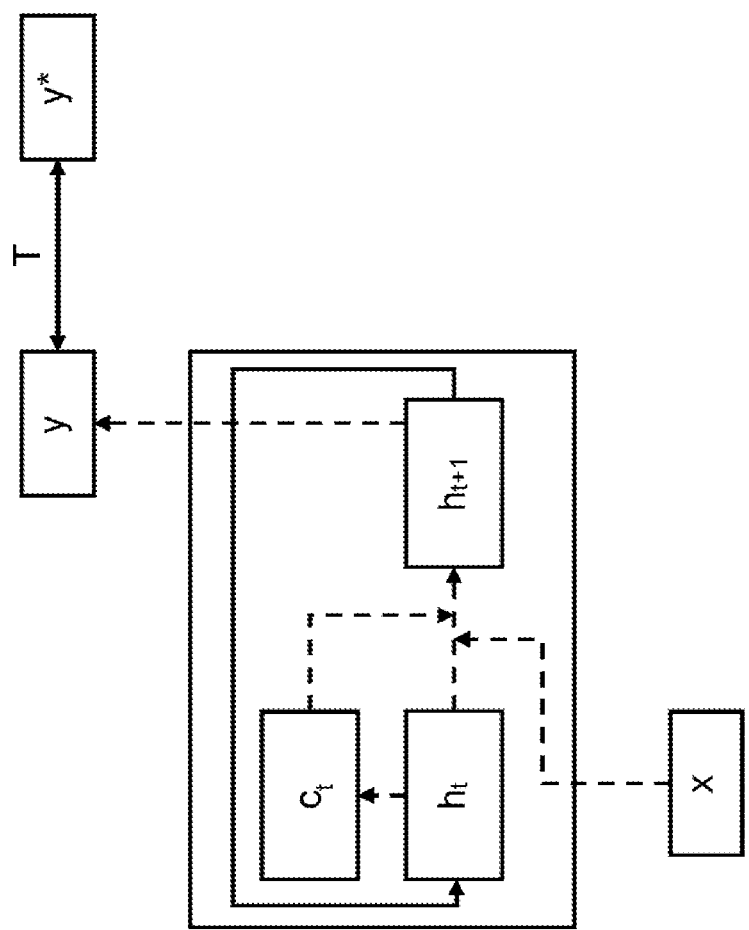
FIG. 2 is another artificial neural network known from the prior art as a long short-term memory network.
Figure 4:
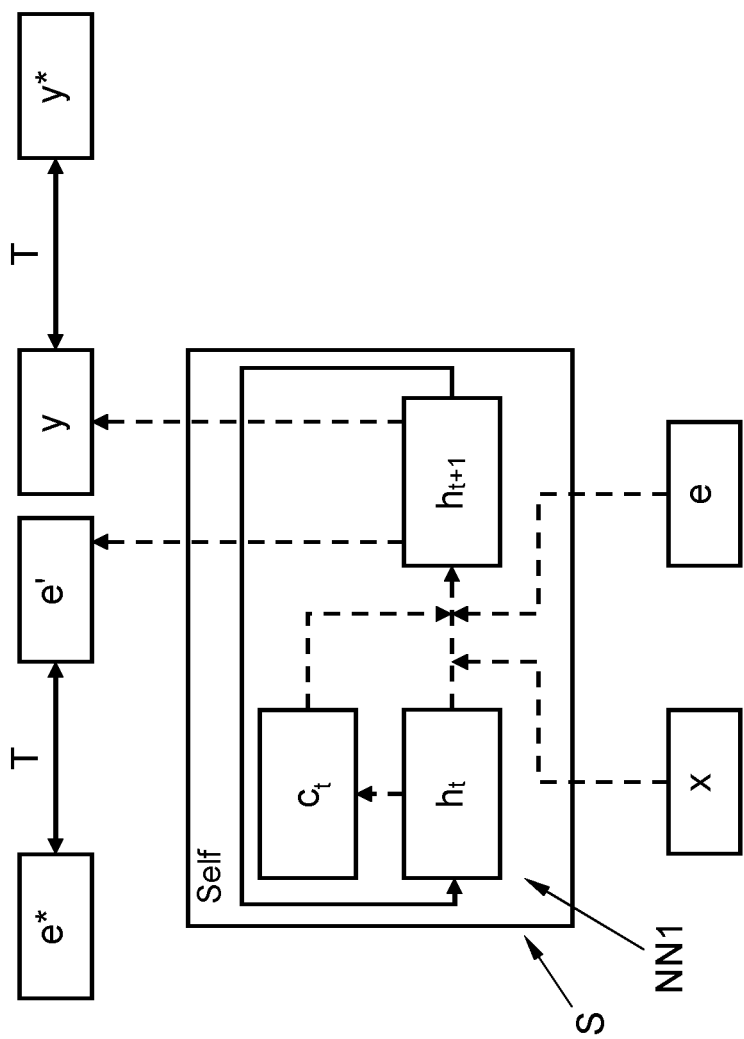
FIG. 4 is a system according to the invention as an extension of the artificial neural network shown in FIG. 2.

FIG. 4 shows an expansion according to embodiments of the invention of the long short-term memory network shown in FIG. 2 by means of an emotion. Except for the underlying neural network, the embodiment shown in FIG. 4 corresponds to the embodiment shown in FIG. 3.

The expansion shown in FIG. 3 and FIG. 4 can, however, also be used for other types of neural networks.

For the emotional training, i.e., for the training of the connection fed from the new state $h_{t+1}$ to the second output vector e', two further alternatives are possible in the extensions shown in FIG. 3 and FIG. 4, which can, however, also be used together with the training based on the second reference e*:

1) The second output vector e' (output emotion) is compared not only to the second reference e* but also to the second input vector e. This way, it can be ensured that the second output vector e' also actually matches the second input vector e, i.e., matches the input emotion.

2) The second output vector e' (output emotion) is not only derived from the new state $h_{t+1}$ of the first neural network NN1, but it is also derived by taking into account the first output vector y, i.e., the second output vector e' is derived from the new state $h_{t+1}$ of and the first output vector y. This makes it possible to train all parameters in the network purely through emotions.

These two alternatives can also be combined.

Furthermore, these two alternatives can be applied to the expansions of a neural network according to embodiments of the invention shown in FIG. 6 to FIG. 9.

Figure 5:
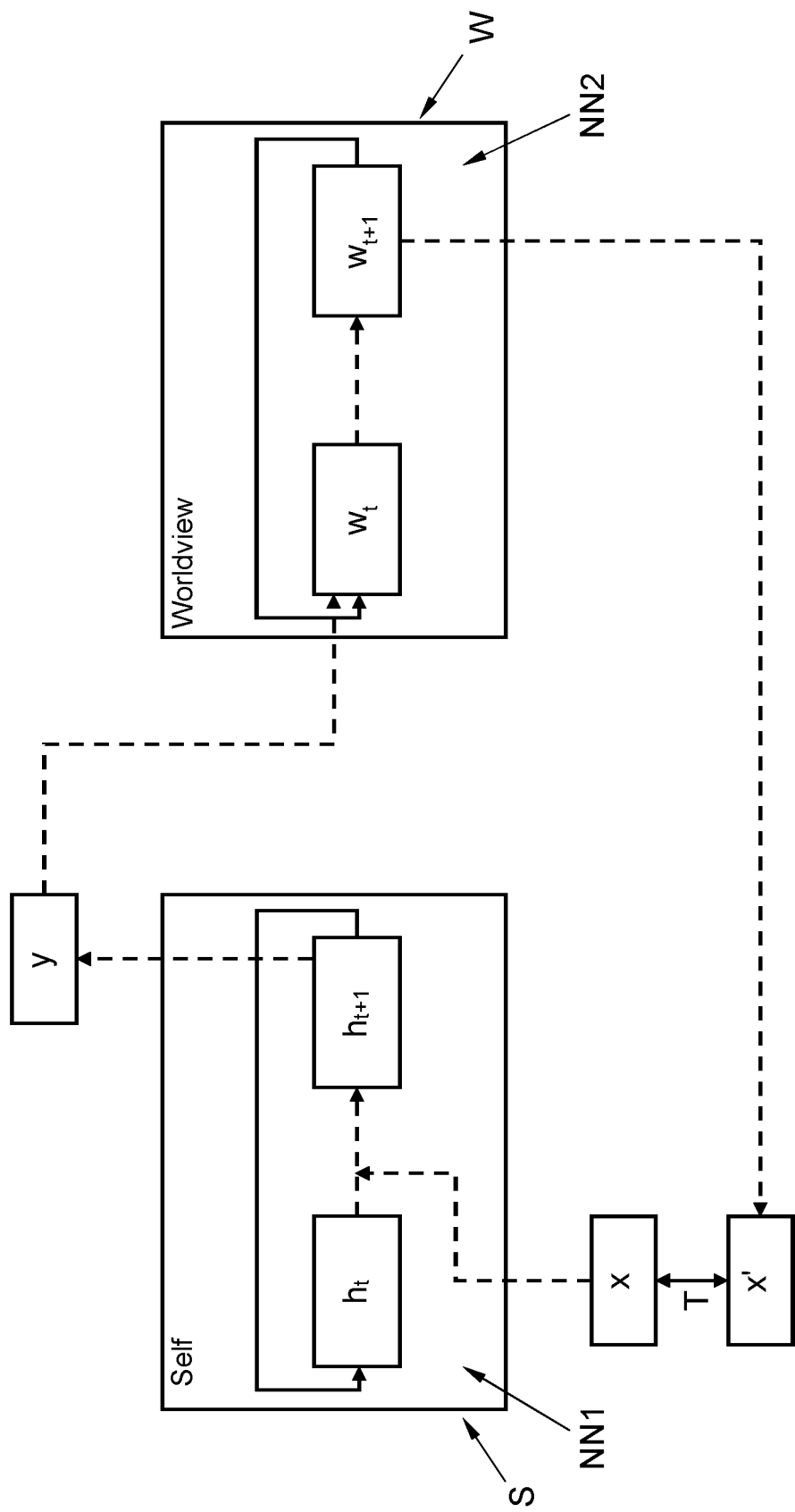
FIG. 5 is a system according to the invention as an extension of the artificial neural network shown in FIG. 1.

FIG. 5 shows a system according to the invention as an extension of the artificial neural network shown in FIG. 1;

With the extension shown in FIG. 5, it is possible to dispense with the ideal reference, i.e., the first reference y*, which is used for training the first output vector y. While an exactly predefined target variable is absolutely necessary in the prior art for training the neural network NN1, such a target variable is no longer necessary in the case of the expansion shown in FIG. 5.

In the expansion shown in FIG. 5, a second neural network NN2 is provided in addition to the first neural network NN1. The first neural network NN1 is coupled to the second neural network NN2, wherein the first output vector y of the first neural network NN1 is fed to the second neural network NN2 as the first input vector y of the second neural network NN2.

The second neural network NN2 is implemented by a second agent W in this case. The second agent W is also referred to below as the worldview since, with a second neuronal network NN2, a world model can be learned as part of the overall system. Thus, the behavior of the world is modeled with the second neural network NN2, for example an environment in which a robot is located. The second neural network NN2 can, for example, be a recurrent neural network with any other type of neural network also being able to be used.

The second neural network NN2 uses the first input vector y (=first output vector y of the first neural network NN1) to generate an expected reaction of the second agent W or the worldview to the first input vector y of the second neural network NN2. This expected reaction is made available as the first output vector x' of the second neural network NN2. To generate the first output vector x' of the second neural network NN2, the first input vector y of the second neural network NN2 and a current state $w_t$ of the second neural network NN2 are converted together into a new state $w_{t+1}$ of the second neural network NN2. The first output vector x' of the second neural network NN2 is then generated from the new state $w_{t+1}$ of the second neural network NN2.

The first output vector x' of the second neural network NN2 is compared to the first input vector x of the first neural network NN1 in order to train the first neural network NN1. The first neural network NN1 is thus trained on the basis of the behavior of the second neural network NN2 or on the basis of the first output vector x' of the second neural network NN2.

On the basis of the actual outputs and the generated expectation or the first output vector x' of the second neural network NN2, the overall system shown in FIG. 5 can be fully trained so that all learnable parameters can be estimated.

Figure 6:
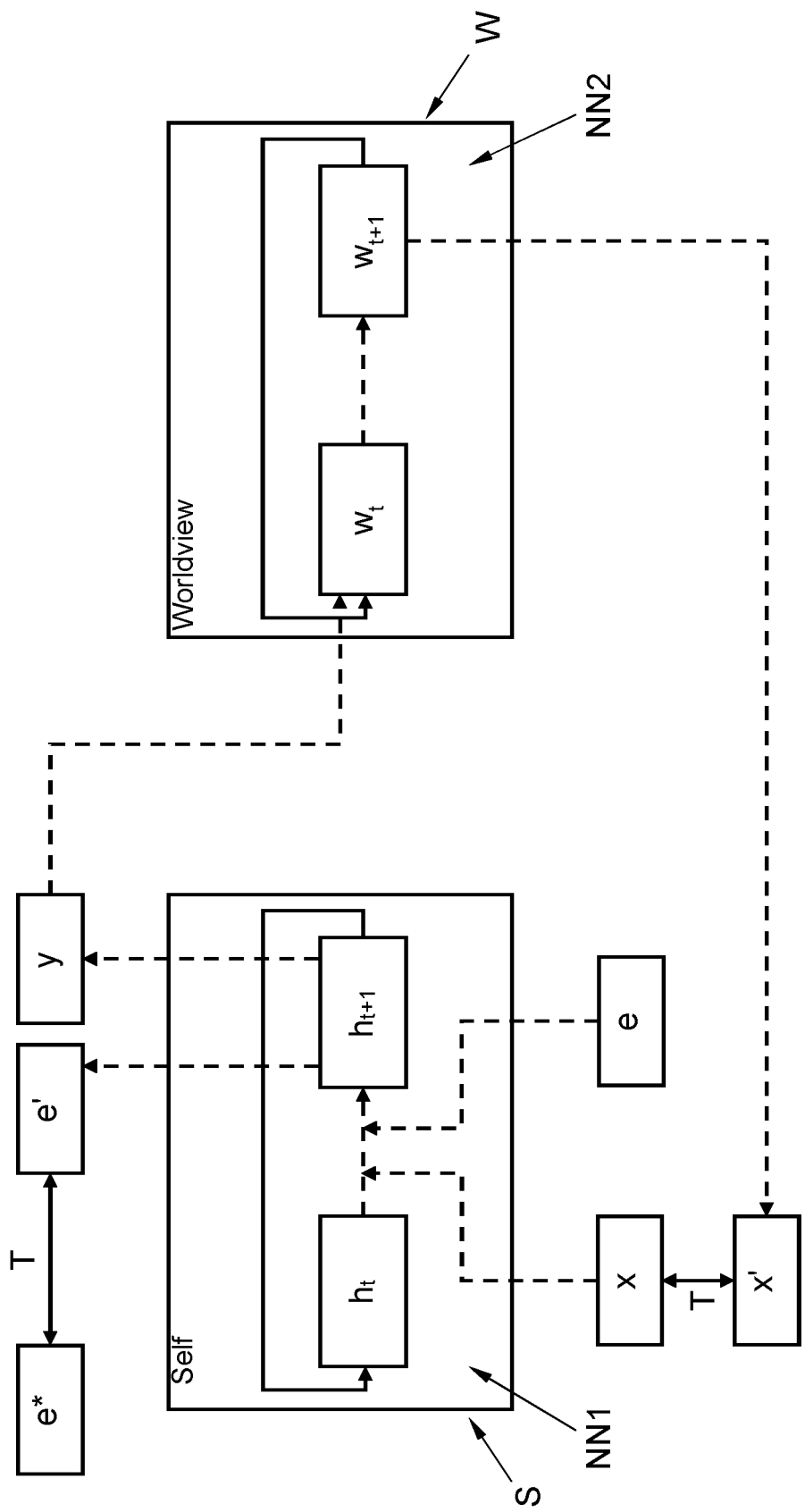
FIG. 6 is an expansion of the system according to the invention shown in FIG. 5.

FIG. 6 shows an expansion according to embodiments of the invention of the system shown in FIG. 5, with the system shown in FIG. 6 being a combination of the systems shown in FIG. 3 and FIG. 5.

The actual control system, i.e., the agent S, with which a technical system, for example a robot, is controlled can be controlled or trained in this case on the one hand via the emotions (second input vector e of the first neural network NN1 or second output vector e' of the first neural network NN1). This ensures that the first neural network NN1 or the first agent S pursues a state that is as desirable as possible.

On the other hand, the output of the first neural network NN1 (i.e., the first output vector y of the first neural network NN1) is compared via the worldview (i.e., via the second neural network NN2 or via the second agent W) to the input of the first neural network NN1 (i.e., compared to the first input vector x of the first neural network NN1) because the worldview can produce an expected input (i.e., a first output vector x' of the second neural network NN2) with the first input vector x of the first neural network NN2 being trained with the first input vector x' of the second neural network NN1. This means that a training can be carried out without reference.

The system or the first agent S can therefore be trained completely without annotated data and only requires incentives which characterize states as desirable or undesirable. These incentives can be encoded by using sparse annotation, for example, extreme events such as a collision, or parameters that are easy to detect, for example falling energy levels.

The two above-mentioned variants for the emotional training can also be used in the system shown in FIG. 6.

Figure 7:
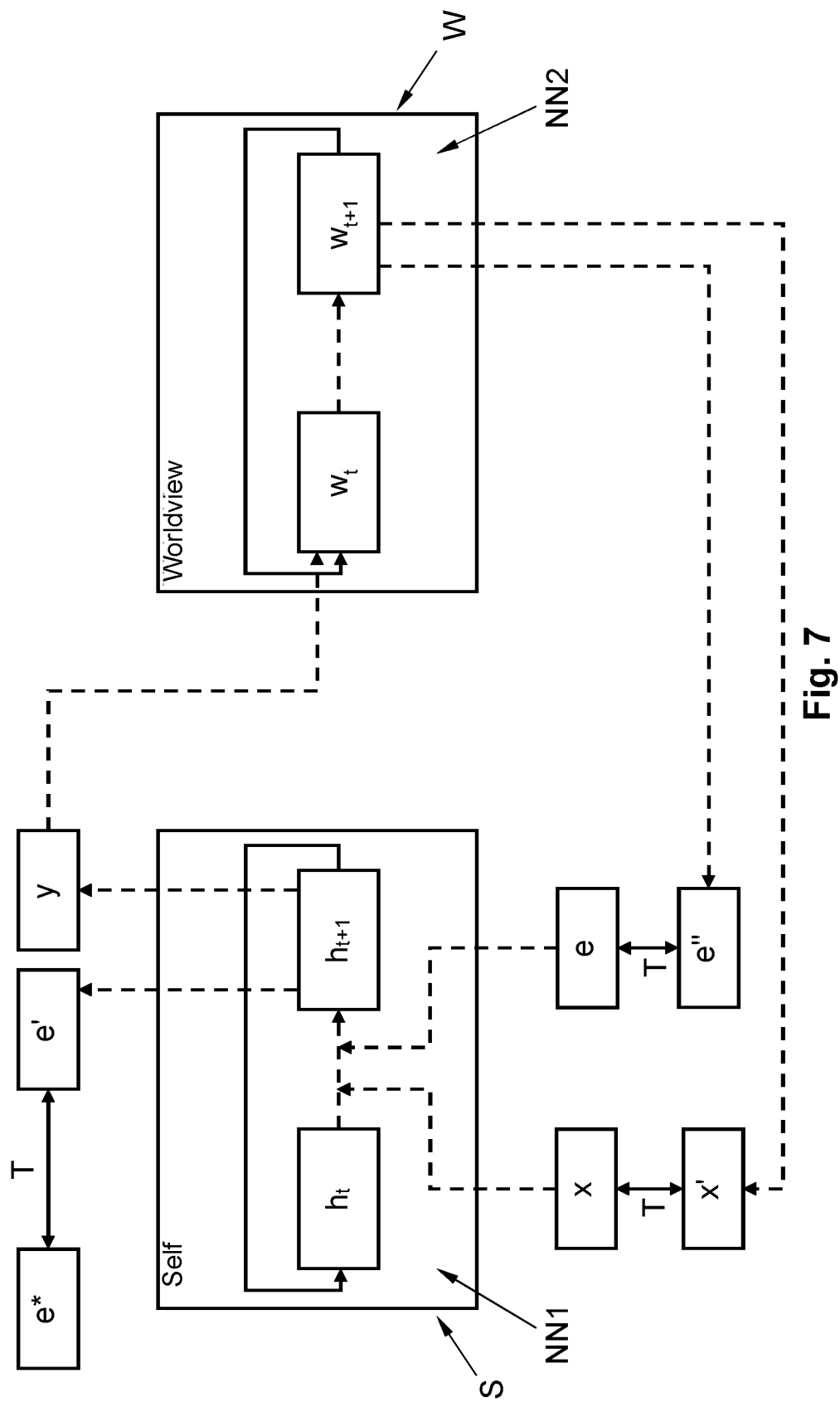
FIG. 7 is an expansion of the system according to the invention shown in FIG. 6.

FIG. 7 shows an expansion of the system according to embodiments of the invention shown in FIG. 6.

In addition to the first output vector x' of the second neural network NN2, a second output vector e'' of the second neural network NN2 is generated. The second output vector e'' of the second neural network NN2 is derived from the new state $w_{t+1}$ of the second neural network NN2. The second output vector e'' of the second neural network NN2 here represents an expected emotion of the new state $w_{t+1}$ of the second neural network NN2.

The expected emotion could, for example, result from the actions of another participant in the world, i.e., a counterpart. If, for example, a counterpart is made to laugh, a positive reaction can also be expected, or if, for example, a robot collides with another robot, an alarm signal can be expected from the other robot. These expected emotions or the second output vector e'' of the second neural network NN2 can also be compared to the second input vector e of the first neural network NN1, which also makes it possible for the first neural network NN1 to be trained.

The training of the first neural network NN1 by means of the second output vector e'' of the second neural network NN2 can contribute to the stabilization of the overall training of the first neural network NN1 in the sense of the so-called multi-task learning. Based on the connection of the first neural network NN1 via the second agent W or via the second neural network NN2, abstract effects such as the effects of an output y of the first neural network NN1 on the worldview, the resulting change in state of the worldview and consequently the emotional feedback on the Self or on the first neural network NN1 can be modeled.

Figure 8:
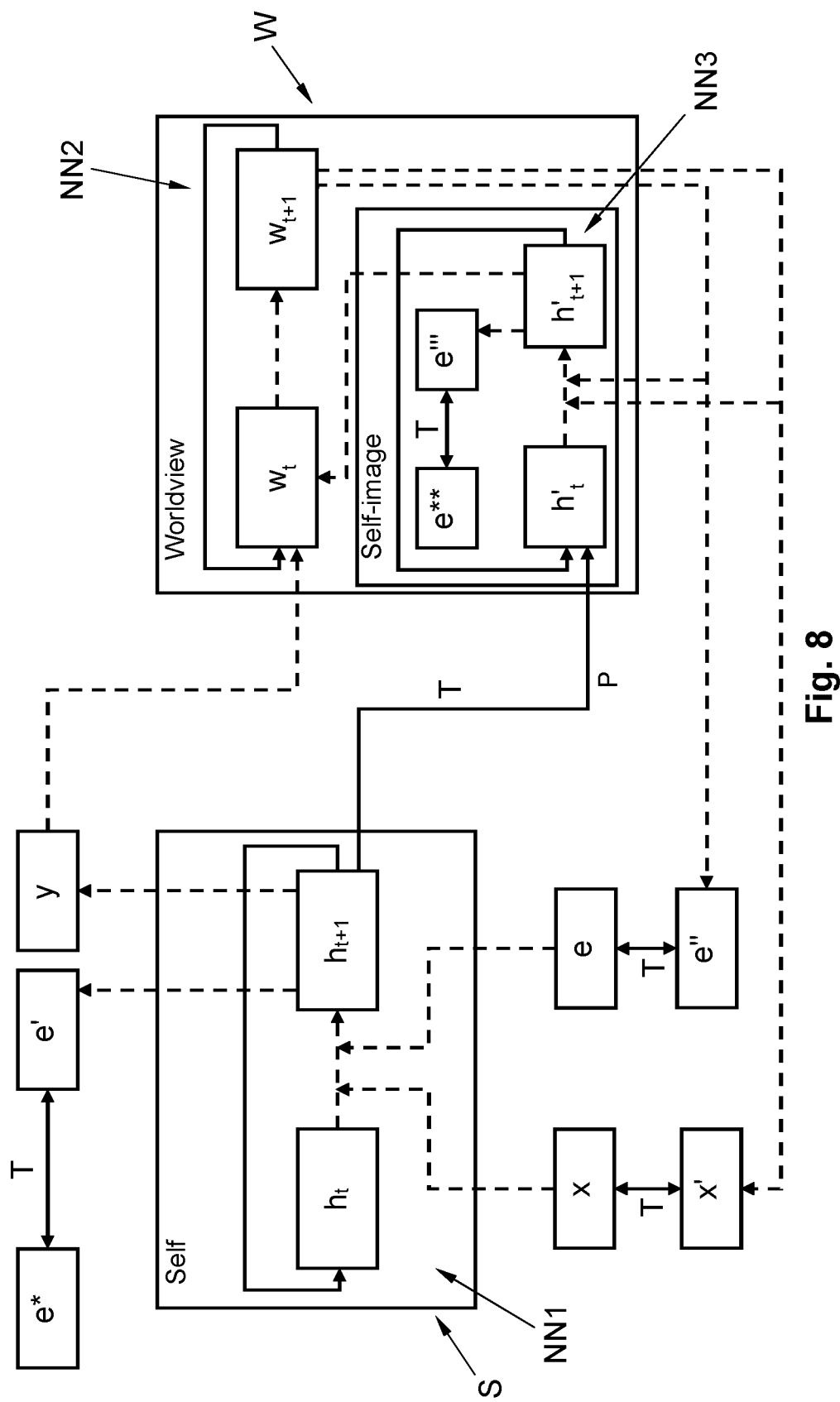
FIG. 8 is an expansion of the system according to the invention shown in FIG. 7.

FIG. 8 shows an expansion of the system according to embodiments of the invention shown in FIG. 7.

According to the extension shown in FIG. 8, the second agent W implements a third neural network NN3 so that not only the state of the worldview can be encoded with the second agent W or the second neural network NN2, but also a model of the self-image of the worldview can be estimated.

The first output vector x' of the second neural network NN2 is fed to the third neural network NN3 as the first input vector x' of the third neural network NN3. In addition, a second output vector e'' of the second neural network NN2 is fed to the third neural network NN3 as a second input vector e'' of the third neural network NN3. As already explained above, the second output vector e'' of the second neural network NN2 represents an expected emotion of the new state $w_{t+1}$ of the second neural network NN2. The second output vector e'' of the second neural network NN2 is generated from the new state $w_{t+1}$ of the second neural network NN2.

The first input vector x', the second input vector e'' and the current state $h'_t$ of the third neural network NN3 are used together to convert the third neural network NN3 into a new state $h'_{t+1}$.

A first output vector y' of the third neural network NN3 is generated from the new state $h'_{t+1}$ of the third neural network NN3, which is fed to the second neural network NN2 as a further input vector of the second neural network NN2. By means of this connection of the two neural networks NN3 and NN2 via the first output vector y' of the third neural network NN3, the worldview and the self-image of the second agent W are coupled. This makes it possible for the two neural networks NN3 and NN2 to be able to simulate interactions even without the first neural network NN1.

In addition, a second output vector e''' of the third neural network NN3 is generated from the new state $h'_{t+1}$ of the third neural network NN3. The second output vector e''' of the third neural network NN3 represents an expected emotion of the new state $h'_{t+1}$ of the third neural network NN3.

The second output vector e''' of the third neural network NN3 is compared to a third reference e for the purpose of training the third neural network NN3. The comparison of the second output vector e''' of the third neural network NN3 to the third reference e can, in this case, also includes the calculation of a distance function, for example of the above-mentioned distance functions. The third reference e** represents an ideal state of the second output vector e''' of the third neural network NN3 and thus an ideal state of the expected emotion of the new state $h'_{t+1}$ of the third neural network NN3.

Furthermore, the first neural network NN1 and the third neural network NN3 can be coupled to one another, for example by coupling the new state $h_{t+1}$ of the first neural network NN1 and the current state $h'_t$ of the third neural network NN3 to one another. This coupling is indicated in FIG. 8 (and in FIG. 9) by the arrow P. This advantageously makes it possible to train the third neural network NN3 based on the first neural network NN1 or to train the first neural network NN1 based on the third neural network NN3.

The self-image or the third neural network NN3 does not generate any outputs or output vectors that are available as outputs or output vectors of the second agent W. However, the self-image or the third neural network NN3 can be used to research changes in the worldview based on changes in the self-image based on the first output vector y' of the third neural network NN3 (which is not made available outside the second agent W).

With the aid of the coupling P, it is also possible to operate the overall system in two different states, which, in this case, are referred to as the waking phase and the dream sleep phase.

In the waking phase, the first agent S or the first neural network NN1 is coupled to the second agent W or to the third neural network NN3 (arrow P). The self-image or the third neural network NN3 learns from every action of the first neural network NN1 how the action changes the own state and the state of the worldview or of the second agent W.

In the dream sleep phase, the first agent S or the first neural network NN1 is decoupled from the second agent W or from the third neural network NN3 (no arrow P). In the decoupled state, the first output vector y of the first neural network NN1 is not fed to the second neural network NN2. In this state, the self-image or the third neural network NN3 can act freely within the second agent W.

Since the worldview or the second neural network NN2 can generate both expected inputs (first input vector x' of the third neural network NN3) and expected emotions (second input vector e" of the third neural network NN3) and the third neural network NN3 can generate the further input (further input vector y' of the second neural network NN2), the worldview or the second neural network NN2 and self-image or the third neural network NN3 can alternate in a completely free manner.

Training is still possible for the first agent S or the first neural network NN1, since the new state $h_{t+1}$ of the Self or of the first neural network NN1 still generates the second output vector e' of the first neural network NN1, which can be compared to the second (ideal) reference e*.

Dreaming can therefore be used to generate an improved interaction of the self-image or the third neural network NN3 with the expected worldview.

In an alternative variant, the internal states are not coupled, but rather, the learned connections (arrows) in the first neural network NN1 and the third neural network NN3 are coupled. This creates a configuration in which a training of the self-image (of the third neural network NN3) also causes an improvement in the actual Self (of the first neural network NN1). Alternatively, the Self and the self-image can swap roles when the Self is decoupled from the input and the output. This means that, instead of training both networks loosely via distance functions, both networks can use the same memory for the weights. Both therefore always assume the same value for the parameters of the first neural network NN1 and the third neural network NN3.

Figure 9:
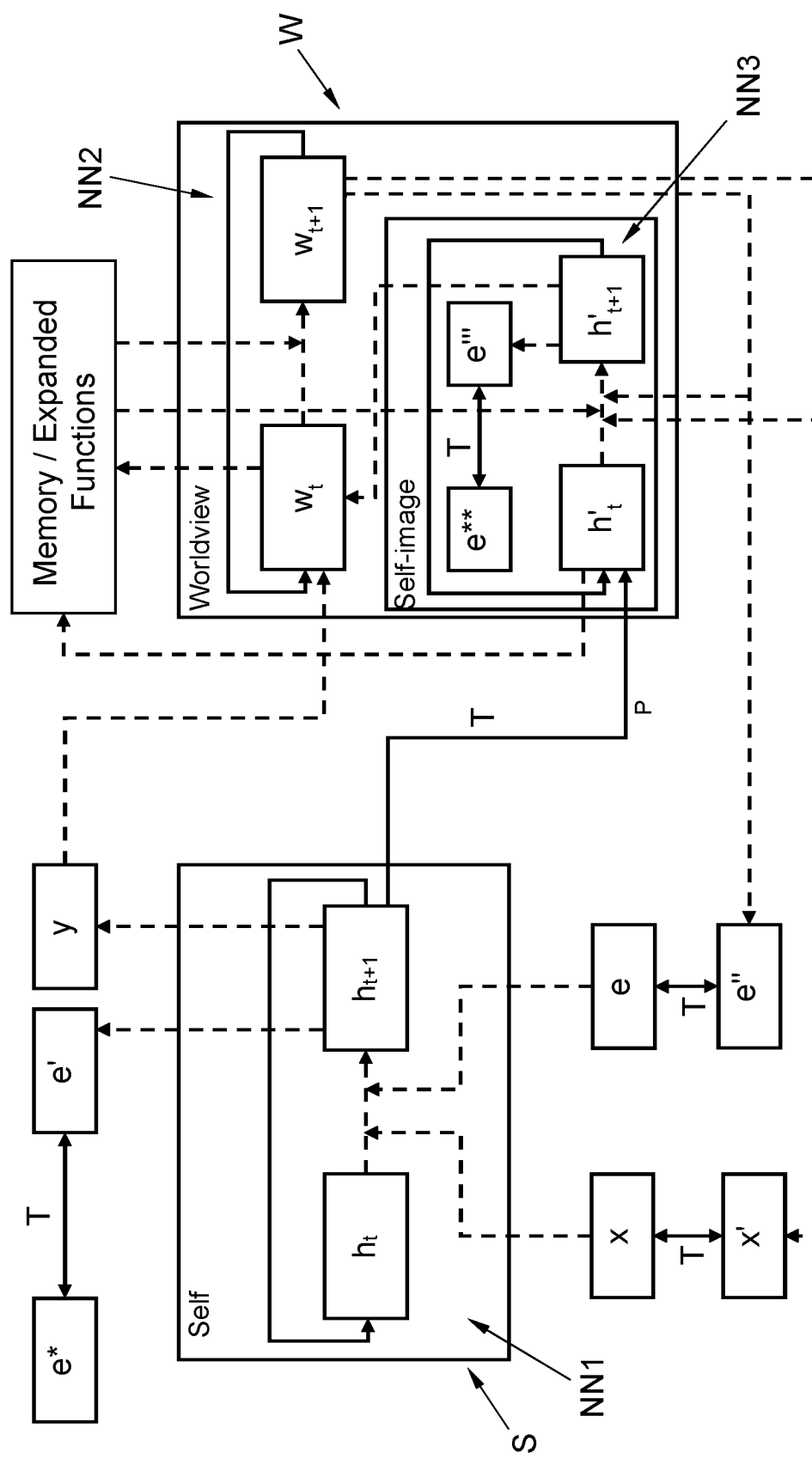
FIG. 9 is an expansion of the system according to the invention shown in FIG. 8.

FIG. 9 shows an expansion of the system according to embodiments of the invention shown in FIG. 8. According to the extension shown in FIG. 9, the overall system shown in FIG. 8 can be coupled with extended functions. These extended functions could, for example, be an extended memory (designed as a storage device) that can store and load the state of the second neural network NN2 and/or the state of the third neural network NN3. Further extensions, only listed as examples, can be:

a speech processor which can convert the state of the second neural network NN2 and/or the state of the third neural network NN3 into symbol sequences of words and letters;

advanced input functions such as the visual and auditory cortex;

a speech synthesis module that can generate human speech;

tactile and movement planning modules that can model and execute complex motor plans;

modules for loading and saving graphs, which make it possible to link, process, save and load different states of the world and the self-image with one another (associative memory);

modules for processing and evaluating propositional logic and arithmetic;

extended feeling functions, which make it possible to recognize complex social actions and to map them to feelings;

In addition, further modules can be provided which can interact with the state of the second neural network NN1 and the state of the third neural network NN3.

An example of a technical system that can be controlled with embodiments of the present invention is a Mars rover that performs tasks independently and gradually explores its surroundings.

The second input vector e of the first neural network NN1 can represent, for example, vital parameters (charge level of the accumulator, functionality of the axes, etc., the parameters of which can be provided by suitable sensors). The second input vector e of the first neural network NN1 can also represent or describe goals, for example the urge to explore one's surroundings (curiosity) or the processing of tasks (loyalty), with the extended functions shown in FIG. 9 potentially being used for this purpose.

The extended functions can bring about changes in the state of the second agent W directly in the self-image or in the third neural network NN3. If, for example, the list of tasks has not yet been completed, the state of the second agent W changes in such a way that it causes an emotion e' (represented by the second output vector of the first neural network NN1), which in turn arouses the desire in the first agent S to complete the list. Additional extended functions may be necessary for this purpose. A task planner can be provided as an extended function, for example, which enables the first agent S to perform a sequence of actions.

The provision of extended functions makes it possible to expand the functional scope of the first agent S in a modular manner. In particular, free functions can also be provided that are only learned when necessary.

The exploration of the environment of the Mars rover, i.e., the learning of the worldview, takes place analogously. In this case, an extended mapping function (for example using Simultaneous Localization and Mapping (SLAM), in which a map and the position of the Mars rover are estimated at the same time) can be provided. The relevant information can be provided by suitable sensors, such as ultrasonic sensors or lidar. Another module can examine the map for gaps and errors. If such gaps or errors are found, the state of the self-image or of the third neural network NN3 can be changed in such a way that a corresponding emotion e' (represented by the second output vector of the first neural network NN1) is generated. As a result, the system or the first agent S tries to leave this state and to correct the errors and/or gaps in the map. This can then also be done by using a task planner.

For the extended functions, pre-trained neural networks or direct algorithms can be used if these are implemented on the basis of differentiable programming. This advantageously makes it possible to mix neural networks and programming, as a result of which the development and the training of the neural networks are considerably accelerated.

With the method according to embodiments of the invention, an overall solution is provided for the first time, which can be trained in a manner comparable to the human perception process by means of emotions and an interaction with the world. To do so, it is not necessary to provide a fixed worldview, as is required in the prior art.

Rather, the worldview is learned autonomously. Desirable actions are learned purely through emotions with a weak identification. According to the method, according to embodiments of the invention, the agent S can therefore act completely autonomously and in a self-learning manner. According to the further development shown in FIG. 8, even a self-image in the world or the worldview is modeled with which the worldview can be trained. The system according to FIG. 8 can learn in the waking and sleeping phases without any interaction with the real world being necessary.

In addition, many neo-anatomical and neuropathological observations can be found in the system according to FIG. 8, for example:

The switching off the Self or the first agent S would put the overall system in a state in which it can only interact with itself. This state is described in neuropathology as the locked-in syndrome.

The entire consciousness could be turned off completely. This could be achieved by removing the worldview. The entire system could still act, but it would no longer be able to create complex plans since the worldview is required to do so. This corresponds to the so-called automatisms observed in neuropathology. The state of sleepwalking produces similar phenomena as well.

A removal of the block e' (second output vector of the first neural network NN1) is comparable to a restriction of the amygdala of the brain. In this case, the overall system can no longer process the emotions correctly. Similar limitations can also be present in autistic disorders.

A limitation of the extended functions shown in FIG. 9 can also be mapped to corresponding neuropathological phenomena. These include, for example, amnesia, cortical deafness or cortical blindness.

Multiple personalities can be generated by incorrectly creating multiple self-images.

Normal neurological processes that are difficult to explain, such as the interaction of the Self and the self-image, which presumably lead to the feeling of consciousness, are thus comprehensible: If the Self actually experiences a situation that the self-image has already experienced in a dream, a sense of déjà-vu arises.

The system is also useful for understanding the qualia problem.

Each system potentially has a different self-image and worldview. Therefore, the same images (e.g., the perception of the color red) are likely, but an exact equality is extremely unlikely. Embodiments of the invention can therefore also be used for an objective study of such phenomena.

In summary, it is possible with embodiments of the invention to map the human consciousness in a previously unknown degree of detail. In addition, the first agent S is able to adapt to completely new environments since both the worldview and self-image can be completely re-learned and adapted. The system is thus able to learn and adjust to changes in the world as well as to observe and take into account changes in the Self No training data is required to use the system. One's own feedback based on the emotion suffices to adjust to complex new situations.

REFERENCE SIGNS e Second input vector of the first neural network NN1
e' Second output vector of the first neural network NN1
e" Second output vector of the second neural network NN2 or second input vector of the third neural network NN3
e''' Second output vector of the third neural network NN3
e* Second reference
e** Third reference
$h_t$ Current state of the first neural network NN1
$h'_t$ Current state of the third neural network NN3
$h_{t+1}$ New state of the first neural network NN1
$h'_{t+1}$ New state of the first neural network NN3
NN1 First artificial neural network
NN2 Second artificial neural network
NN3 Third artificial neural network
P Coupling/arrow
S First agent (also referred to as "Self")
T Training
W Second agent (also referred to as "Worldview")
$w_t$ Current state of the second neural network NN2
$w_{t+1}$ New state of the second neural network NN2
x First input vector of the first neural network NN1
x' First output vector of the second neural network NN2 or first input vector of the third neural network NN3
y First output vector of the first neural network NN1
y' First output vector of the third neural network NN3 or further input vector of the second neural network NN2
y* First reference

What is claimed is:

1. A method for controlling a technical system with a first agent, wherein the first agent implements a first artificial neural network, wherein a first input vector x of the first neural network and a current state of the first neural network are converted together into a new state of the first neural network, and wherein a first output vector y of the first neural network is generated from the new state of the first neural network, the method comprising:

feeding the first output vector y of the first neural network to a second artificial neural network as the first input vector y of the second neural network, wherein the second neural network is implemented by a second agent, converting the first input vector y of the second neural network and a current state of the second neural network into a new state of the second neural network, generating a first output vector x' of the second neural network from the new state of the second neural network, wherein the first output vector x' of the second neural network represents an expected reaction of the second neural network to the first input vector y of the second neural network, and training the first neural network by comparing the first output vector x' of the second neural network to the first input vector x of the first neural network, and wherein the second agent implements a third artificial neural network, the method further comprising:

feeding the first output vector x' of the second neural network to the third neural network as the first input vector x' of the third neural network, feeding the third neural network to a second output vector e'' of the second neural network as a second input vector e'' of the third neural network, wherein the second output vector e'' of the second neural network represents an expected emotion of the new state of the second neural network, converting the first input vector x', the second input vector e'' and the current state of the third neural network together into a new state of the third neural network, generating a second output vector e''' of the third neural network from the new state of the third neural network, wherein the second output vector e''' of the third neural network represents an expected emotion of the new state of the third neural network, and generating from the new state of the third neural network, a first output vector y' of the third neural network, which is fed to the second neural network as a further input vector y' of the second neural network, wherein the first neural network and the third neural network are coupled to one another in order to train the third neural network based on the first neural network or the first neural network based on the third neural network.

2. The method of claim 1, wherein the second output vector e''' of the third neural network is compared to a third reference e for the purpose of training the third neural network, wherein the comparison of the second output vector e''' of the third neural network to the third reference e comprises the calculation of a distance function, preferably an Euclidean distance, and wherein the third reference e** represents an ideal state of the second output vector e''' of the third neural network and thus an ideal state of the expected emotion of the new state of the third neural network.

3. A method for controlling a technical system with a first agent, wherein the first agent implements a first artificial neural network, wherein a first input vector x of the first neural network and a current state of the first neural network are converted together into a new state of the first neural network, and wherein a first output vector y of the first neural network is generated from the new state of the first neural network, the method comprising:

feeding the first output vector y of the first neural network to a second artificial neural network as the first input vector y of the second neural network, wherein the second neural network is implemented by a second agent, converting the first input vector y of the second neural network and a current state of the second neural network into a new state of the second neural network, generating a first output vector x' of the second neural network from the new state of the second neural network, wherein the first output vector x' of the second neural network represents an expected reaction of the second neural network to the first input vector y of the second neural network, and comparing the first output vector x' of the second neural network to the first input vector x of the first neural network in order to train the first neural network wherein:

a second input vector e is fed to the first neural network, the second input vector e, the first input vector x and the current state of the first neural network are converted together into the new state of the first neural network, wherein the second input vector e of the first neural network represents an emotion, and a second output vector e' of the first neural network is generated from the new state of the first neural network in addition to the first output vector y of the first neural network, wherein the second output vector e' of the first neural network represents an expected emotion of the new state of the first neural network, wherein the first neural network and a third neural network are coupled to one another in order to train the third neural network based on the first neural network or the first neural network based on the third neural network.

4. The method of claim 3, wherein the second output vector e' of the first neural network is compared to a second reference e* for the purpose of training the first neural network, wherein the comparison of the second output vector e' of the first neural network to the second reference e* comprises the calculation of a distance function, preferably an Euclidean distance, and wherein the second reference e* is an ideal state of the second output vector e' of the first neural network and thus an ideal state of the expected emotion of the new state of the first neural network.

5. The method of claim 4, wherein the second output vector e' of the first neural network is compared to the second input vector e of the first neural network, and the second output vector e' of the first neural network is generated from the new state of the first neural network and from the first output vector y of the first neural network.

6. The method of claim 3, wherein the second output vector e'' of the second neural network is generated from the new state of the second neural network, and the second output vector e'' of the second neural network is compared to the second input vector e of the first neural network in order to train the first neural network.

* * * * *